United States Patent
Yoshii

(10) Patent No.: US 10,363,664 B2
(45) Date of Patent: Jul. 30, 2019

(54) INFORMATION PROCESSING APPARATUS, INFORMATION PROCESSING METHOD, AND RECORDING MEDIUM

(71) Applicant: CANON KABUSHIKI KAISHA, Tokyo (JP)

(72) Inventor: Hiroto Yoshii, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 121 days.

(21) Appl. No.: 15/360,812

(22) Filed: Nov. 23, 2016

(65) Prior Publication Data

US 2017/0154430 A1   Jun. 1, 2017

(30) Foreign Application Priority Data

Nov. 30, 2015   (JP) ................................ 2015-233759

(51) Int. Cl.
| | |
|---|---|
| *G06K 9/00* | (2006.01) |
| *B25J 9/16* | (2006.01) |
| *G06K 9/32* | (2006.01) |
| *G06T 7/70* | (2017.01) |

(52) U.S. Cl.
CPC ........ *B25J 9/1697* (2013.01); *G06K 9/00664* (2013.01); *G06K 9/3233* (2013.01); *G06T 7/70* (2017.01); *G05B 2219/40053* (2013.01); *G06T 2207/10012* (2013.01); *G06T 2207/10028* (2013.01); *G06T 2207/30164* (2013.01)

(58) Field of Classification Search
CPC . B25J 9/1697; G06K 9/00664; G06K 9/3233; G06T 7/00; G06T 7/0044
See application file for complete search history.

(56) References Cited

U.S. PATENT DOCUMENTS

| | | | | |
|---|---|---|---|---|
| 4,715,773 A | * | 12/1987 | Parker | B25J 13/082 318/568.21 |
| 5,040,056 A | * | 8/1991 | Sager | B25J 9/0093 348/88 |
| 7,177,459 B1 | | 2/2007 | Watanabe | |
| 9,102,055 B1 | | 8/2015 | Konolige | |
| 9,102,063 B2 | * | 8/2015 | Ito | B25J 9/1669 |
| 9,333,649 B1 | * | 5/2016 | Bradski | B25J 9/163 |
| 9,492,923 B2 | * | 11/2016 | Wellman | B25J 9/1612 |
| 9,669,543 B1 | * | 6/2017 | Stubbs | B25J 9/1612 |
| 2009/0196714 A1 | * | 8/2009 | Sylvestre | H01L 21/67383 414/217.1 |
| 2011/0126844 A1 | * | 6/2011 | Cinquin | A61B 17/3403 128/845 |
| 2015/0138534 A1 | * | 5/2015 | Tidhar | F41G 3/147 356/51 |
| 2016/0356596 A1 | * | 12/2016 | Kitamura | G01B 11/254 |

FOREIGN PATENT DOCUMENTS

| | | |
|---|---|---|
| CN | 1970413 A | 5/2007 |
| CN | 102414696 A | 4/2012 |
| CN | 104339350 A | 2/2015 |
| CN | 105034024 A | 11/2015 |
| JP | 2012-135820 A | 7/2012 |

* cited by examiner

*Primary Examiner* — Shefali D Goradia
(74) *Attorney, Agent, or Firm* — Canon U.S.A., Inc. IP Division

(57) ABSTRACT

An information processing apparatus acquires an image of multiple objects, acquires positions and orientations of the objects based on the image, and decides the holding order of the objects based on the positions and orientations and a direction that is set.

15 Claims, 10 Drawing Sheets

INFORMATION PROCESSING APPARATUS, INFORMATION PROCESSING METHOD, AND RECORDING MEDIUM

BACKGROUND

Field of Art

The present disclosure relates to a technology for holding an object.

Description of the Related Art

Robot picking systems have hitherto been used in which a part is automatically picked up using a robot from a state in which parts are loaded in bulk. In such a robot picking system, an image of a state in which multiple parts, which are target objects, are arranged at random in a pallet is captured with x camera provided above the pallet or the state is measured with a three-dimensional measurement apparatus. The position and orientation of a part to be held is determined from the result of the image capturing as the result of the measurement and the part may be held with a robot hand.

In the above case, parts that are located at high positions in the pallet are normally preferentially selected as holding candidates and a part is held with the robot hand in order to cause the robot hand to operate without colliding with other objects as much as possible. In addition, Japanese Patent Laid-Open No. 2012-135820 discloses a method of reliably holding a part that is located at the highest position by shifting the part, instead of holding the part, when the part is higher than other parts by an amount exceeding a predetermined threshold value.

However, the technologies in related art have the following issue. It is premised that the direction of a high position is a picking system coincides with the direction opposite to the direction of gravity. A camera or a measurement apparatus is arranged on the basis of this premise and information processing, such as determination of the holding order to determine which object is preferentially held, is performed. In such a situation, there are cases in which the direction on which the determination of the holding order is based does not necessarily coincide with the direction opposite to the direction of gravity and the picking systems in the related art are not capable of addressing such cases.

SUMMARY

In order to resolve the above issue, an embodiment of the present invention provides a technology to decide a holding order of holding multiple objects from an arbitrary direction.

An embodiment of the present invention provides an information processing apparatus including a unit that acquires an image of a plurality of objects, an acquiring unit that acquires positions and orientations of the objects based on the image, and a deciding unit that decides a holding order of the objects based on the positions and orientations and a direction that is set.

In an embodiment, it is possible to decide a holding order of holding multiple objects from an arbitrary direction.

Further features of aspects of the present invention will become apparent from the following description of exemplary embodiments with reference to the attached drawings.

DESCRIPTION OF THE EMBODIMENTS

Embodiments of the present invention will herein be described with reference to the attached drawings. The embodiments described below are examples in which the present invention is specifically embodied and are specific examples of components described in the claims.

[First Embodiment]

Figure 3:
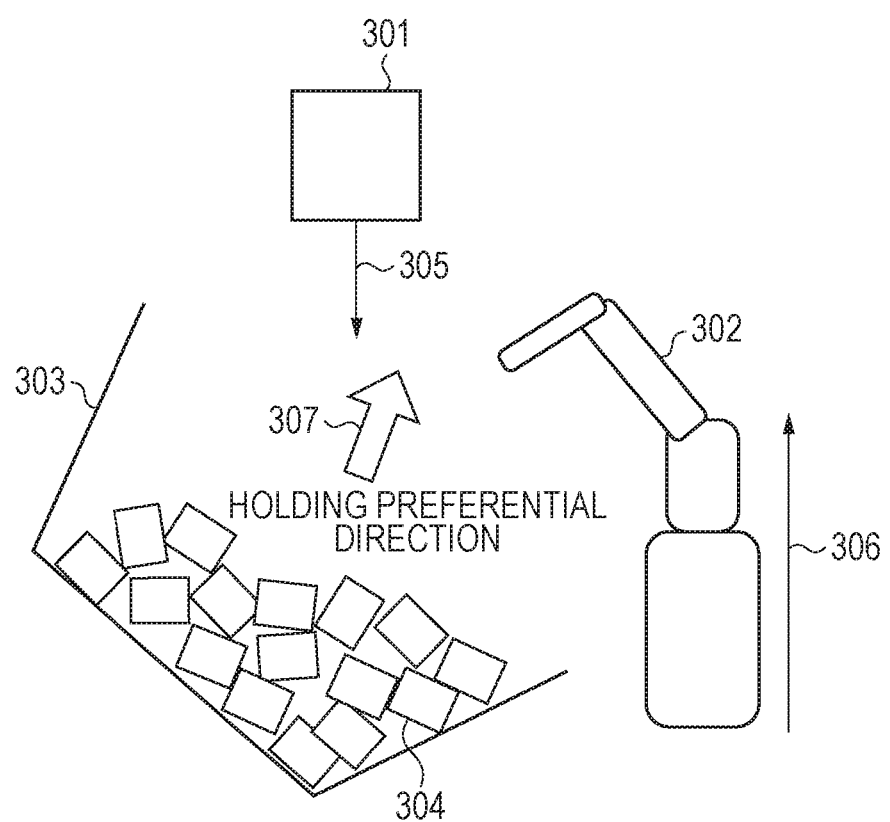
FIG. 3 illustrates an exemplary picking system.

Issues in the related art will now be described, taking as an example a picking system that holds (picks up) an object, as illustrated in FIG. 3. Referring to FIG. 3, reference numeral 301 denotes an imaging apparatus, reference numeral 302 denotes a robot (robot arm), reference numeral 303 denotes a pallet, reference numeral 304 denotes objects, reference numeral 305 denotes a Z direction of the imaging apparatus 301, and reference numeral 306 denotes a Z direction of the robot 302. The Z direction means in the positive Z-axis direction in an XYZ coordinate system in the following description. Specifically, the Z direction 305 is the positive Z-axis positive direction in the coordinate system of the imaging apparatus 301 and the Z direction 306 is the positive Z-axis direction in the coordinate system of the robot 302.

As described above, the direction (holding preferential direction) on which determination of the holding order to determine which object is to be preferentially held is based may be different from the vertically downward direction. For example, the holding preferential direction may be a direction 307 illustrated in FIG. 3 on the basis of the positional relationship between the pallet 303 and the robot 302. The direction 307 may be in a different direction than one or more of the direction of an opening of the pallet 303 (that is, the direction of the normal vector of a bottom face of the pallet 303), the Z direction 305 of the imaging apparatus 301, and the Z direction 306 of the robot 302. The imaging apparatus has been arranged so that the holding preferential direction is parallel to the Z direction of the imaging apparatus in normal picking systems. However, there are cases in which the imaging apparatus is not capable of being arranged at an arbitrary position in an arbitrary direction due to constraint conditions of the system, such as the movable range of the robot. The example illustrated in FIG. 3 corresponds to such a case and the picking systems in the related art have an issue in that the picking systems are not capable of specifying desired holding preferential directions.

In addition, robot picking systems having a function to select a high place in a pallet, detect and recognize an object in the selected place, and hold the detected object with a robot have hitherto been used. This function is also implicitly performed on the basis of the Z direction 305 of the imaging apparatus or the measurement apparatus in the related art. Accordingly, the picking systems in the related art have an issue in that the high place is not capable of being selected as the object detection and recognition region on the basis of a direction that is not related to the Z direction 305 of the imaging apparatus 301, such as the one illustrated in FIG. 3.

Furthermore, robot picking systems having a function to check the angle of the holding orientation in holding of an object have hitherto been used. Also in this function, the angle is implicitly calculated on the basis of the direction of gravity in the related art. Accordingly, the picking systems in the related art have an issue in that the angle of the holding orientation is not capable of being checked on the basis of a direction that is not related to the direction of gravity, such as the one illustrated in FIG. 3.

Furthermore, robot picking systems having an overlap checking function have hitherto been used. With the overlap checking function, the overlap of objects is calculated and an or having the degree of overlap exceeding a predetermined amount is not held. This function is implicitly based on the Z direction 305 of the imaging apparatus or the measurement apparatus in the related art. Accordingly, the picking systems in the related art have an issue in that the overlap is not capable of being checked on the basis of a direction that is not related to the Z direction 305 of the imaging apparatus, such as the one illustrated in FIG. 3.

In order to resolve the above issues, an information processing apparatus according to a first embodiment acquires an image of multiple objects, acquires the positions and orientations of the objects on the basis of the image, and determines the order of holding the objects on the basis of the positions and orientations and a direction that is set. An example of such an information processing apparatus will now be described. First, an exemplary hardware configuration of the information processing apparatus according to the first embodiment will be described with reference to a block diagram illustrated in FIG. 2.

Figure 2:
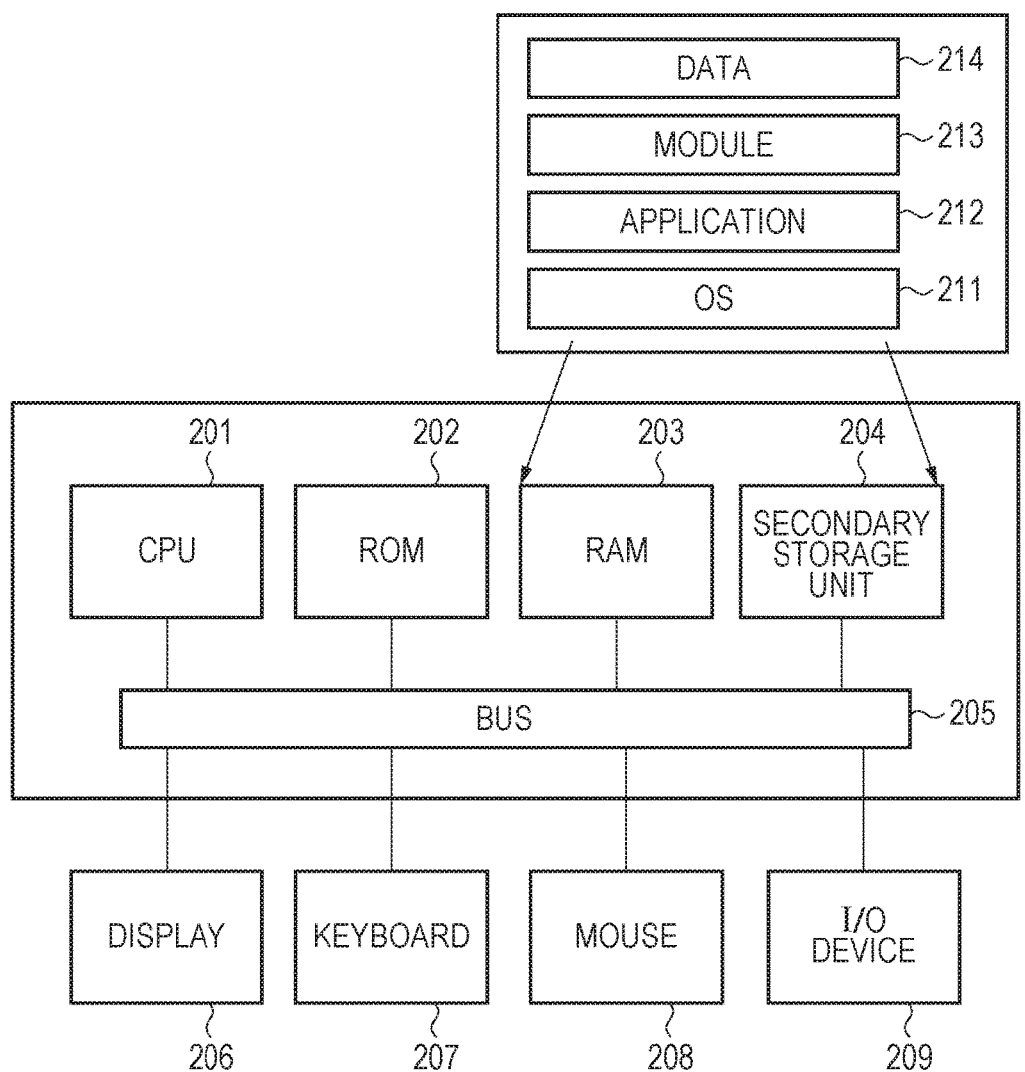
FIG. 2 is a block diagram illustrating an exemplary hardware configuration of an information processing apparatus.

Referring to FIG. 2, a central processing unit (CPU) 201 performs processes using computer programs and data stored in a read only memory (ROM) 202 and a random access memory (RAM) 203 to control the operation of the entire information processing apparatus and to perform or control the respective processes described below, which are performed by the information processing apparatus.

A boot program, setup data, and so on are stored in the ROM 202. The RAM 203 has an area in which computer programs and data loaded from the ROM 202 and a secondary storage unit 204, data supplied from an input-output (I/O) device 209, and so on are stored. In addition, the RAM 203 has a working area used by the CPU 201 to perform the various processes. As described above, the RAM 203 is capable of appropriately providing various areas.

The secondary storage unit 204 is a large-capacity information storage, such as a hard disk drive. An operating system (OS) 211 and computer programs and data causing the CPU 201 to perform the various processes described above as the ones performed by the information processing apparatus are stored in the secondary storage unit 204. These computer programs include a module 213, an application 212, and so on. The data includes data 214. In addition, information processed in the following description is also stored in the secondary storage unit 204. The computer programs and data stored in the secondary storage unit 204 are appropriately loaded into the RAM 203 under the control of the CPU 201 to be processed by the CPU 201.

A display 206 is composed of, for example, a cathode ray tube (CRT) screen or a liquid crystal screen. The results of the processes performed by the CPU 201 are displayed in the display 206 using images and/or characters. An apparatus, such as a projector, which projects the results of the processes performed by the CPU 201 as images and/or characters may be used, instead of the display 206.

A keyboard 207 and a mouse 208 function as user interfaces with which an operator of the information processing apparatus is capable of inputting various instructions into the CPU 201. A touch panel screen may be provided, instead of or in addition to the display 206, the keyboard 207, and the mouse 208. An input by a user may be accepted with the touch panel screen and the result of the processes performed by the CPU 201 may be displayed on the touch panel screen.

The I/O device 209 may include a device that supplies a variety of information to the information processing apparatus and a device that supplies a variety of information from the information processing apparatus to an external apparatus. In the first embodiment, the I/O device 209 at least includes a device capable of acquiring an image including an object. For example, an imaging apparatus that captures a two-dimensional image in which the pixel value of each pixel represents a luminance value and a device (for example, x three-dimensional input device, such as a time-of-flight (TOF) sensor) that captures a distance image in which the pixel value of each pixel represents a three-dimensional distance to each position in a distance measurement range of the device are applicable to such a device.

In addition, for example, two stereo cameras may be used as the I/O device 209. In this case, each of the two stereo cameras captures an image including as object and the CPU 201 calculates the three-dimensional distance to each position in the space of the captured image with a triangulation method using the image captured by each of the two stereo cameras. The distance image may be generated in the above manner.

Furthermore, for example, one pattern light projector and one or more imaging apparatuses may be used as the I/O device 209. In this case, the pattern light projector projects a projection pattern (for example, an image generated through space coding or an image generated through spatial trigonometric functions used in a phase shift method) on an object. The imaging apparatus captures an image of the object on which the projection pattern is projected and the CPU 201 applies a known technology using the image to measure the distance to the object. The distance image is generated in the above manner. In order to achieve the same object, a method may be adopted in which a random dot pattern is projected on an object with a pattern light projector and an image of the object is captured with two imaging apparatuses. In order to achieve the same objective, an optical cutting method using laser slit light may also be adopted.

The I/O device 209 may also include a device that transmits a variety of information (for example, the attribute and the position of an object) acquired through the respective processes described below by the information processing apparatus to an external device, such as a robot, for holding the object. It is assumed in the first embodiment that a robot (robot arm) for holding an object is connected to the device included in the I/O device 209. The robot arm changes its position and orientation and holds the object under the control of the information processing apparatus.

The CPU 201, the ROM 202, the RAM 203, the secondary storage unit 204, the display 206, the keyboard 207, the mouse 208, and the I/O device 209 are connected to a bus 205.

For example, a personal computer (PC) or a mobile terminal device, such as smartphone or a tablet terminal device, is applicable to the device having the configuration illustrated in FIG. 2. The configuration illustrated in FIG. 2 may be realized on a built-in device, a digital camera, or a distributed system via a network.

Object picking systems each including the information processing apparatus having the above configuration will now be described with reference to FIG. 3 and FIG. 4. Although the information processing apparatus is not illustrated in FIG. 3 and FIG. 4 for description, the imaging apparatus 301 corresponds to the I/O device 209 and the robot 302 is connected to the I/O device 209 in FIG. 3. An imaging apparatus 402 corresponds to the I/O device 209 and a robot 404 is connected to the I/O device 209 in FIG. 4.

The picking system illustrated in FIG. 3 will be described first. Referring to FIG. 3, the imaging apparatus 301 is an example of the I/O device 209 and is mounted so that the image capturing direction is the vertically downward direction (the direction of gravity). In this case, the Z direction 305 is the vertically downward direction in the coordinate system based on the imaging apparatus 301.

The robot 302 is connected to the information processing apparatus and the operation of the robot 302 is controlled by the information processing apparatus. For example, the robot 302 changes its position and orientation under the control of the information processing apparatus to hold any of the objects 304 loaded in the pallet 303. The Z direction 306 is the vertically upward direction in the coordinate system based on the robot 302.

The multiple objects 304 are loaded in bulk in the pallet 303 and the pallet 303 is installed so as to be inclined from the ground (inclined at an angle clockwise in the example in FIG. 3). Installing the pallet 303 so as to be inclined produces a situation in which the robot 302 is capable of easily holding an object loaded in the pallet 303. At this time, although the surface of the loaded objects is inclined from a horizontal plane, the angle of the inclination of the surface of the loaded objects is smaller than that of the inclination of the bottom face of the pallet 303. This is because, although the objects are shifted downward (rightward in FIG. 3) to some extent due to the influence of the gravity, the objects do not flow down from the pallet 303 completely, unlike liquid, because of the friction between the objects. When the objects loaded in bulk, such as the ones illustrated in FIG. 3, are to be sequentially held by the robot 302 from the objects on the surface layer, the direction 307 different from the direction of the normal of the bottom face of the pallet 303 is preferably set to a reference direction in determination of which object is to be preferentially held.

The picking system illustrated in FIG. 4 will be described next. Referring to FIG. 4, the imaging apparatus 402 is an example of the I/O device 209 and is mounted to a ceiling 401 so that the image capturing direction is set to the vertically downward direction (the direction of gravity). In this case, a Z direction 403 is the vertically downward direction in the coordinate system based on the imaging apparatus 402.

The robot 404 is mounted to the ceiling 401, like the imaging apparatus 402. In addition, the robot 404 is connected to the information processing apparatus and the operation of the robot 404 is controlled by the information processing apparatus. For example, the robot 404 changes its position and orientation under the control of the information processing apparatus to hold and pick up any of objects 405 loaded in the pallet. The robot 404 places the object 405 that is picked up on a working table 407 where the object 405 is processed. An object 408 that has been picked up is placed on the working table 407 in FIG. 4.

The multiple objects 405 are loaded in bulk into the pallet. An apparatus 406 supplies a new object to the pallet. When the objects loaded in bulk in a loaded state illustrated in FIG. 4 are to be sequentially held by the robot 404 from the objects on the surface layer, the objects are preferably held under a condition in which the objects are sequentially held from the ones closest to the surface layer and closest to the working table 407. Accordingly, a direction 409 different from the direction of the normal of the bottom face of the pallet is preferably set to the reference direction in the determination of which object is preferentially held.

Designing the picking systems described above, illustrated in FIG. 3 and FIG. 4, achieves unprecedented convenience. Specifically, designing the picking system illustrated in FIG. 3 allows the picking system to be assembled with a smaller robot while it is necessary to prepare a large robot having a long arm that can reach the corners of the pallet in the related art. Designing the picking system illustrated in FIG. 4 allows the picking to be continued continuously without stopping the system and replacing the pallet while it is necessary to stop the system to replace the pallet during replenishment of objects in the related art. However, since the holding preferential direction is implicitly set to the vertical direction in object recognition technologies in the related art, it is not possible to realize flexible system operation, such as the ones illustrated in FIG. 3 and FIG. 4. In the first embodiment, it is possible to flexibly set the holding preferential direction, thus realizing the flexible system designs illustrated in FIG. 3 and FIG. 4.

Figure 1:
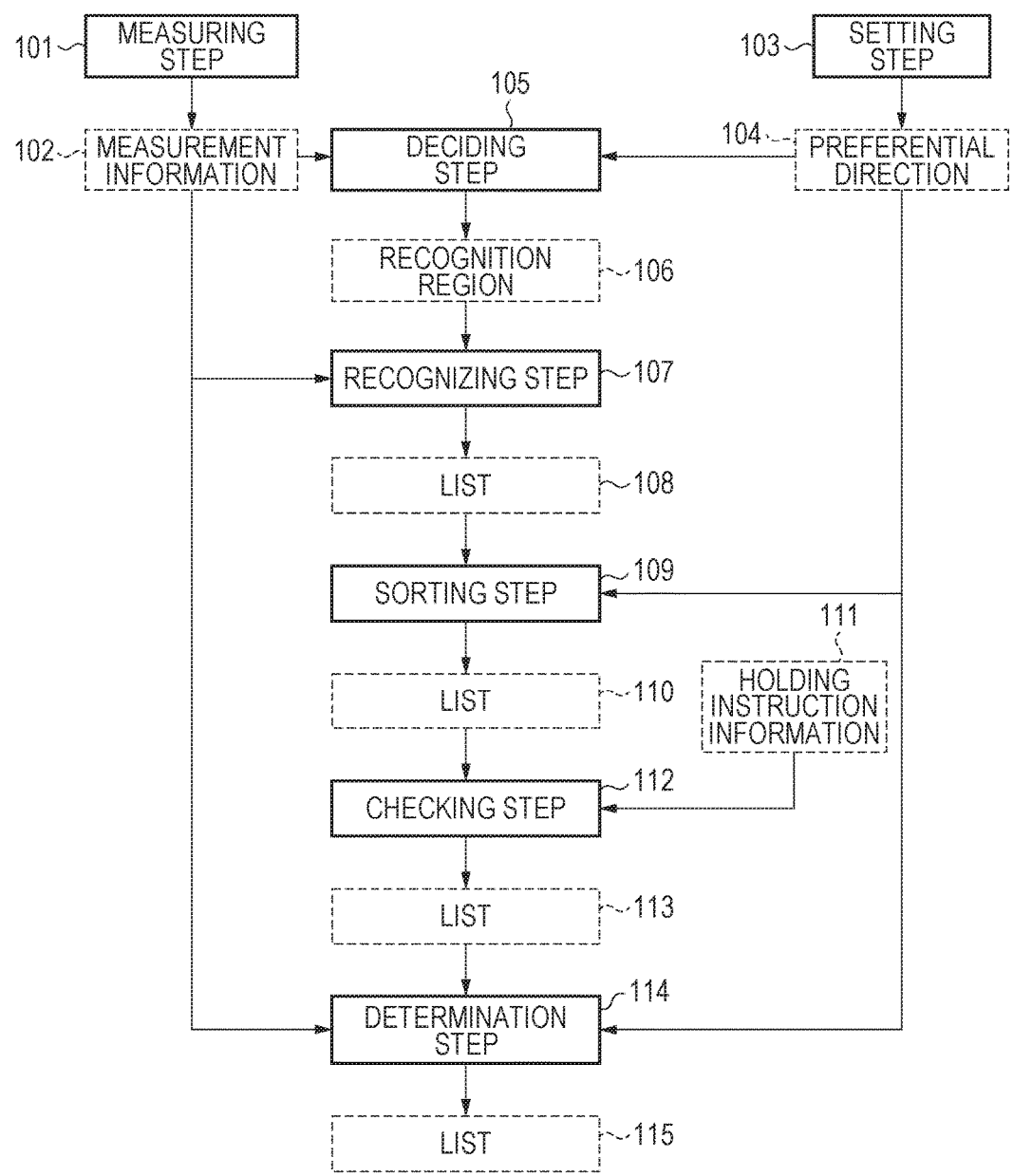
FIG. 1 is a flowchart of a process performed by a picking system.

A process performed by the picking system to cause a robot (including the robot 302 in FIG. 3 and the robot 404 in FIG. 4) to hold one object, among objects loaded in bulk in a pallet, will now be described with reference to a flowchart illustrated in FIG. 1. FIG. 1 is a data flow diagram describing the operation of the system. The data flow diagram in FIG. 1 includes steps surrounded by solid lines and pieces of data surrounded by broken lines.

<Measuring Step 101>

In a measuring step 101, the I/O device 209 captures an image of all or part of objects loaded in bulk in the pallet or measures all or part of the objects and outputs the result of the image capturing or the measurement as measurement information 102. The measurement information 102 is, for example, a two-dimensional image in which the pixel value of each pixel represents a luminance value, a distance image in which the pixel value of each pixel represents a three-dimensional distance to each position in a distance measurement range of the device, an image captured by a stereo camera, or an image of an object on which a projection pattern is projected, as described above. In other words, the measurement information 102 is necessary for recognizing the positions and orientations of the objects.

<Setting Step 103>

In a setting step 103, the user sets a preferential direction 104 in the holding with the keyboard 207 and/or the mouse 208 and the CPU 201 acquires the set preferential direction 104. In the example in FIG. 3, the CPU 201 acquires the direction 307 as the preferential direction 104. In the example in FIG. 4, the CPU 201 acquires the direction 409 as the preferential direction 104. The timing of the setting step 103 is not limited to timing after the measuring step 101 as long as the CPU 201 performs the setting step 103 before a deciding step 105 described below.

<Deciding Step 105>

In the deciding step 105, the CPU 201 decides a peripheral region including a point on an object closest to the information processing apparatus, viewed from the preferential direction 104 side as a recognition region 106 using the measurement information 102 and the preferential direction 104. In the recognition of an object to be held in the loaded objects, a region where object recognition is performed is desirably determined in advance.

Figure 4:
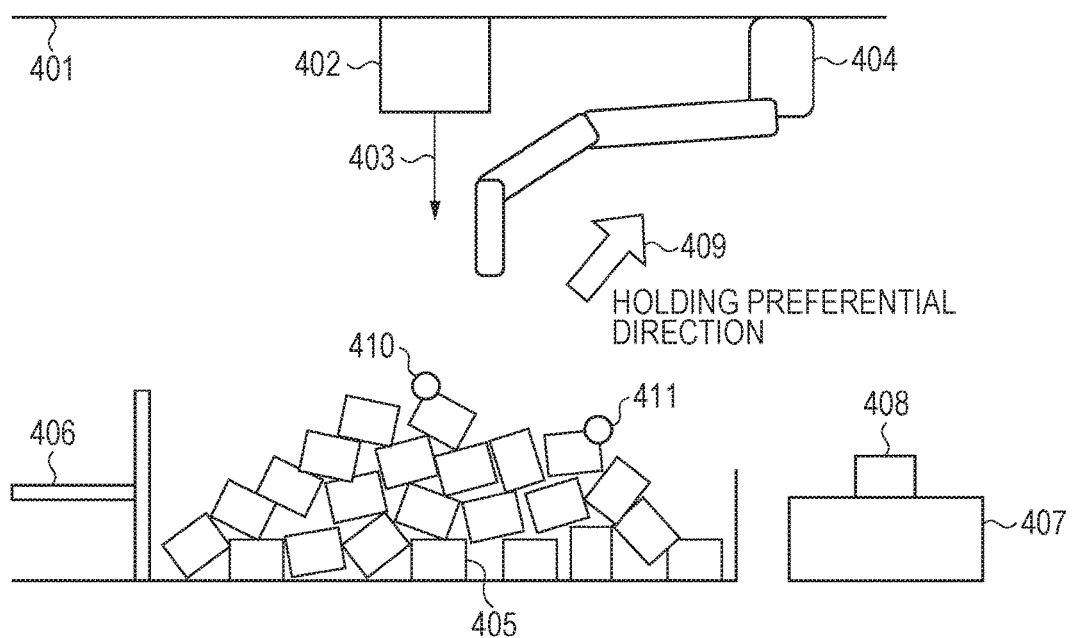
FIG. 4 illustrates another exemplary picking system.
Figure 5:
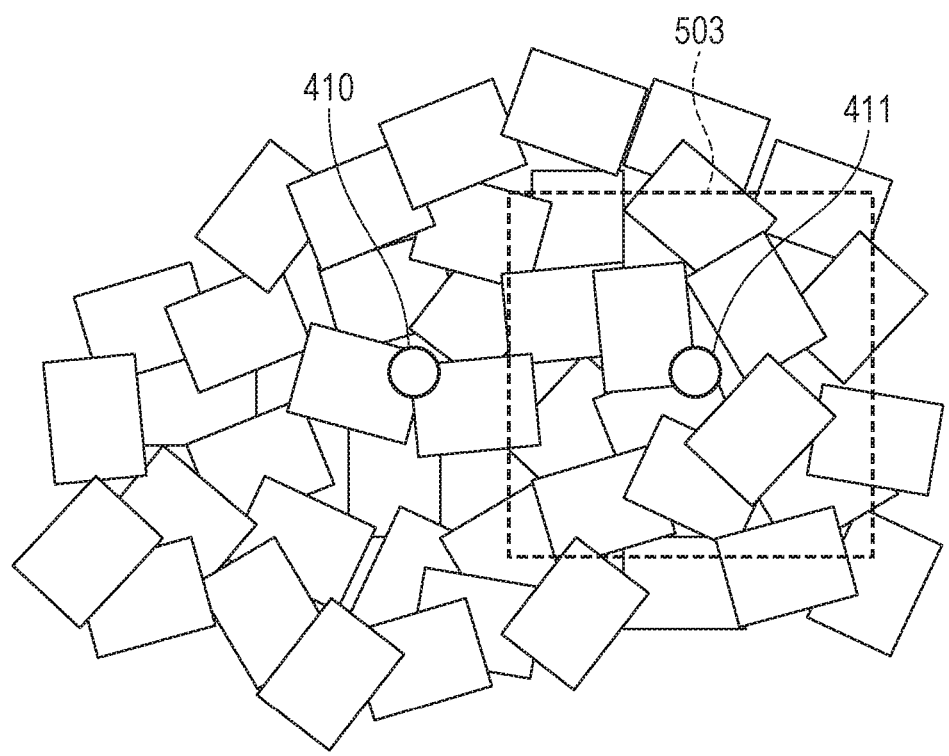
FIG. 5 illustrates an example of an image capturing range of an imaging apparatus.

In the example in FIG. 4, when the distance from one point on the ground is considered along the vertical direction (when the distance is based on the vertical direction), one point on an object that is most apart from the ground is a point 410 indicated by a white circle. In contrast, when the distance from one point on the ground is considered along the direction 409 (when the distance is based on the direction 409), one point on an object that is furthest from one point on the ground is a point 411 indicated by a white circle. Accordingly, in this case, a peripheral region including the point 411 is set as the recognition region 106 in the first embodiment. For example, when the imaging apparatus 402 has an image capturing range illustrated in FIG. 5, a peripheral region 503 including the point 411 is set as the recognition region 106. As a result, the recognition region 106 is set at a position near the robot 404, which is slightly on the right side with respect to the center of the objects loaded in bulk, as illustrated in FIG. 5. Although the shape of the peripheral region 503 is a rectangle in FIG. 5, the shape of the peripheral region 503 is not limited to a rectangle. The shape of the peripheral region 503 may be a trapezoid resulting from projection of a rectangle on a plane, an ellipse, or a region surrounded by a general closed curve. When a large portion of the image capturing range or the measurement range is covered with a large object, the recognition region 106 may be set to the entire image capturing range or the entire measurement range. In a recognizing step 107 described below, recognition of an object (including recognition of its position and orientation) is performed in the recognition region 106.

The recognition region 106 is set using, for example, the following method. The use of the measurement information 102 allows the three-dimensional coordinate (the three-dimensional coordinate in the coordinate system in which the I/O device 209 is set as the origin) of each point (each three-dimensional point) in the image capturing range or the measurement range of the I/O device 209 to be acquired, as described above. Accordingly, the three-dimensional coordinate of each point is projected on a straight line the direction vector of which is the preferential direction 104. A point on the three-dimensional coordinate, which is positioned at an end in the preferential direction 104 (the upper right direction in FIG. 4), among the three-dimensional coordinates of the projected points, is identified and the peripheral region including the identified point is set as the recognition region 106. A schematic height map (a map on a plane having the normal in the preferential direction 104) may be created in a region where the object exists with respect to the preferential direction 104 and the recognition region 106 may be provided in a highest region in the schematic height map.

<Recognizing Step 107>

In the recognizing step 107, the CPU 201 recognizes an object in the recognition region 106 (including recognition of the position and orientation of the object) using the measurement information 102 and creates a list 108 in which the recognized position and orientation of the object is registered for each object existing in the recognition region 106. Since the technology to recognize the post ion and orientation of an object using the measurement information 102 is known, a description of this technology is omitted herein. The position of an object means a three-dimensional coordinate of a point that is representative of the object. For example, the position of an object may be the three-dimensional coordinate of the centroid position of the object or the three-dimensional coordinate of a computer-aided design (CAD) origin in design of the object.

<Sorting Step 109>

In a sorting step 109, the CPU 201 sorts the positions and orientations of the respective objects registered in the list 108 so as to be arranged based on the positions and orientations of the objects on the preferential direction 104 side relative to the positions and orientations of the objects at the side opposite to the preferential direction 104 and generates a list 110 for sorting. For example, each three-dimensional coordinate registered in the list 108 is projected on a straight line the direction vector of which is the preferential direction 104. Then, the positions and orientations of the respective objects is the list 108 are sorted so that the positions and orientations of the respective objects are arranged from the position and orientation of an object in which the projected three-dimensional coordinate is at an end in the preferential direction 104 to the position and orientation of an object in which the projected three-dimensional coordinate is at an end is the direction opposite to the preferential direction 104.

<Checking Step 112>

In a checking step 112, the CPU 201 checks whether the robot is capable of holding the object having each position and orientation registered in the list 110. Various checking methods corresponding to the object and the robot are available. An exemplary checking method will now be described with reference to FIGS. 6A and 6B.

Figure 6A:
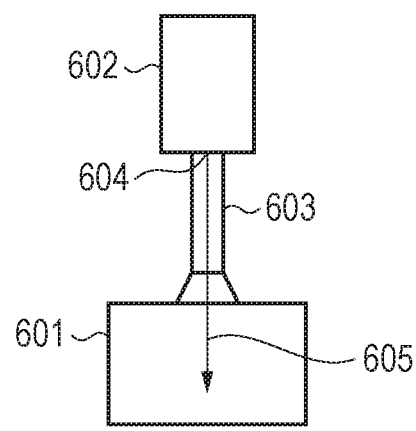
FIGS. 6A and 6B are diagrams for describing a checking step.

An attraction hand 603 is mounted to an end portion of an arm 602 of the robot and an object 601 is attracted with the attraction hand 603 to be moved, as illustrated in FIG. 6A. An origin 604 is set at a distal end (flange) of the arm 602 and a vector 605 extending from the origin 604 toward the distal end of the attraction hand 603 is defined.

Figure 6B:
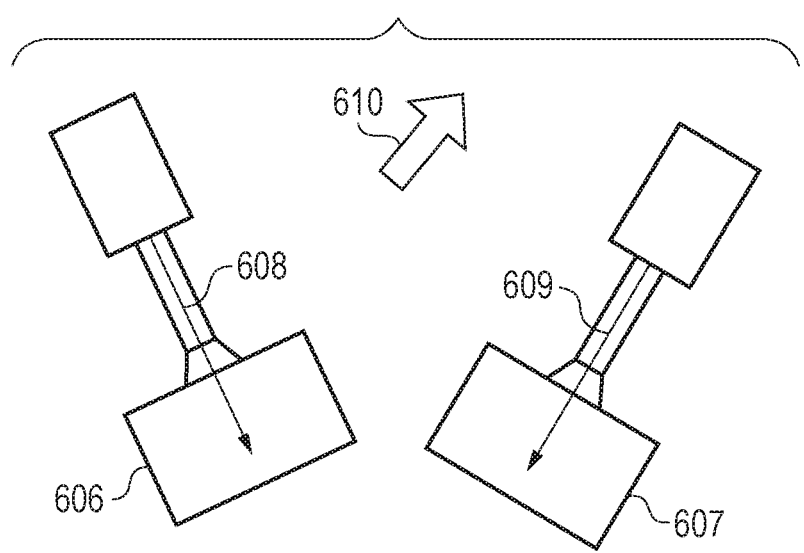

It is assumed that objects 606 and 607 are recognized in a manner illustrated in FIG. 6B in the recognizing step 107. When the position and orientation of an object is specified, information (for example, the position and orientation of the robot arm) necessary for the robot to hold the object having the position and orientation is stored in advance in the secondary storage unit 204 in the information processing apparatus as holding instruction information 111. Accordingly, upon recognition of the position and orientation of the object 606, the CPU 201 identifies the position and orientation of the arm 602 for attracting the object 606 having the position and orientation with the attraction hand 603 using the holding instruction information 111. The same applies to the object 607. The position and orientation of the arm 602 acquired on the basis of the position and orientation of the recognized object 606 and the holding instruction information 111 and the position and orientation of the arm 602 acquired on the basis of the position and orientation of the recognized object 607 and the holding instruction information 111 are indicated in FIG. 6B. In a system in the related art, which is based on the holding of objects from the vertically upward direction, the two objects are considered to have the same degree of difficulty in holding. In contrast, when the robot is arranged on the right side in the drawing, as in FIG. 3, the object to which the robot is capable of easily extending the arm is the object 607, rather than the object 606. The holding of the object 606 may possibly be unavailable when consideration of the movable range of the arm is taken into account.

Accordingly, in the example in FIG. 6B, in order to determine whether the object 606 is capable of being attracted with the attraction hand 603, the CPU 201 calculates the absolute value of the inner product of a vector 608 with a preferential direction 610 and determines whether the absolute value is higher than or equal to a positive threshold value. The vector 608 represents the orientation component of the arm 602, which is calculated on the basis of the position and orientation of the recognized object 606 and the holding instruction information 111 (the vector 608 extends to the distal end of the arm). If the absolute value is higher than or equal to the positive threshold value, the CPU 201 determines that the object 606 is capable of being attracted with the attraction hand 603 (the position and orientation of the arm 602 is capable of being controlled so that the at hand 603 attracts the object 606). If the absolute value is lower than the positive threshold value, the CPU 201 determines that the object 606 is not capable of being attracted with the attraction hand 603 (the position and orientation of the arm 602 is not capable of being controlled so that the attraction hand 603 attracts the object 606). Similarly, in order to determine whether the object 607 is capable of being attracted with the attraction hand 603, the CPU 201 calculates the absolute value of the inner product of a vector 609 with the preferential direction 610 and determines whether the absolute value is higher than or equal to the positive threshold value. The vector 609 represents the orientation component of the arm 602, which is calculated on the basis of the position and orientation of the recognized object 607 and the holding instruction information 111 (the vector 609 extends to the distal end of the arm). If the absolute value is higher than or equal to the positive threshold value, the CPU 201 determines that the object 607 is capable of being attracted with the attraction hand 603 (the position and orientation of the arm 602 is capable of being controlled so that the attraction hand 603 attracts the object 607). If the absolute value is lower than the positive threshold value, the CPU 201 determines that the object 607 is not capable of being attracted with the attraction hand 603 (the position and orientation of the arm 602 is not capable of being controlled so that the attraction hand 603 attracts the object 607).

The process of determining whether each recognized object is capable of being held is described in the above description, taking the holding of the objects with the attraction hand illustrated in FIGS. 6A and 6B as an example. However, the method of holding an object (a holding unit) is not limited to this and, thus, the process of determining whether each recognized object is capable of being held is not limited to the above one. For example, a configuration in which an object is picked up with an opening-closing hand may be adopted or an object holding configuration using a magnet may be adopted.

The vector for which the inner product with the preferential direction 104 is calculated is not limited to the vector extending from the flange to the distal end of the attraction hand. For example, when an end effector holding an object is not the attraction hand illustrated in FIG. 6A, the vector for which the inner product with the preferential direction 104 is calculated is another vector other than the vector extending from the flange to the distal end of the attraction hand. In general, the vector for which the inner product with the preferential direction 104 is calculated may be any vector as long as the vector is in a direction in which the arm is extended for holding.

The CPU 201 checks whether the robot is capable of holding the object having each position and orientation registered in the list 110 in the above manner and deletes the position and orientation of the object the holding of which is determined to be unavailable from the list 110. In other words, the CPU 201 determines an object to be excluded from the objects to be held and deletes the determined object from the list 110. A list 113 results from deletion from the list 110 of the positions and orientations of the objects the holding of which is determined to be unavailable. Accordingly, if any object the holding of which is determined to be unavailable does not exist, the list 113 is the same as the list 110.

<Determination Step 114>

In a determination step 114, the CPU 201 calculates the degree of overlap between each object the position and orientation of which is registered in the list 113 and another object and determines whether the object is capable of being held with the robot on the basis of the result of the calculation of the degree of overlap. The determination step will now be described with reference to FIGS. 7A to 7F. Although all the objects are plate objects an FIGS. 7A to 7F, the objects are not limited to the plate objects and may have other shapes.

Figure 7A:
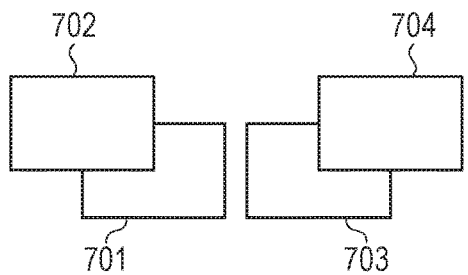
FIGS. 7A to 7F are diagrams for describing a determination step.
Figure 7B:
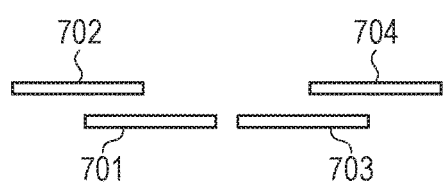
Figure 7C:
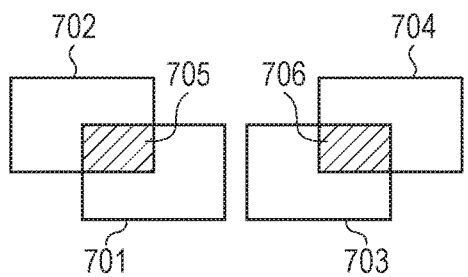
Figure 7D:
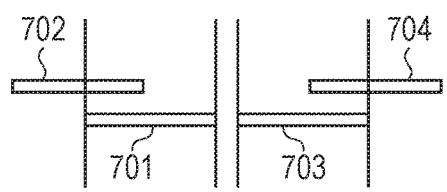
Figure 7E:
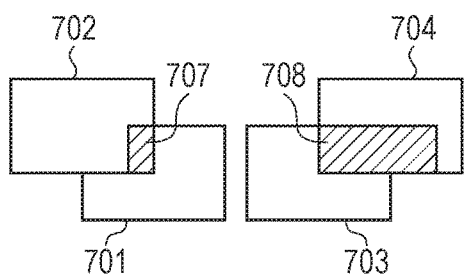
Figure 7F:
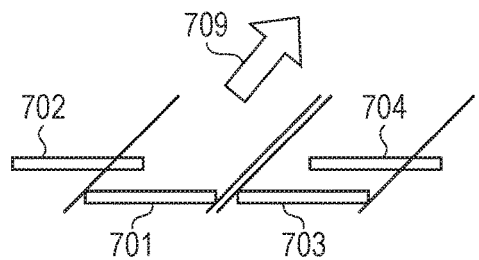

FIGS. 7A, 7C, and 7E illustrate a state in which part of an object 701 is overlapped with part of an object 702, part of an object 703 is overlapped with part of an object 704, and the loaded state of the objects 701 to 704 is viewed from above. FIGS. 7B, 7D, and 7F are cross-sectional views when the states in FIGS. 7A, 7C, and 7E are viewed from a side face, respectively. The state illustrated in FIG. 7A is observed from the imaging apparatus 301 in FIG. 3 and the imaging apparatus 402 in FIG. 4. An overlap portion of objects will now be considered.

In the related art, the overlap between objects is considered in the vertical direction, as illustrated in FIG. 7D. Accordingly, the overlap between the object 701 and the object 702 is illustrated by a portion 705 and the overlap between the object 703 and the object 704 is illustrated by a portion 706. The area of the overlap portion between the object 701 and the object 702 is nearly equal to the area of the overlap portion between the object 703 and the object 704. Accordingly, when the object 701 and the object 703 are recognized, the easiness of holding the object 701 is determined to be similar to the easiness of holding the object 703.

In contrast, in the first embodiment, the overlap between objects is considered in the preferential direction 104. For example, when the preferential direction 104 is a direction 709, as illustrated in FIG. 7F, the overlap between the object 701 and the object 702 in the direction 709 is illustrated by a portion 707, as illustrated in FIG. 7E. The overlap between the object 703 and the object 704 in the direction 709 is illustrated by a portion 708, as illustrated in FIG. 7E. As described above, when the overlap between objects in the direction 709 is considered, the area of the overlap portion between the object 701 and the object 702 is different from the area of the overlap portion between the object 703 and the object 704 and the area of the portion 700 is larger than the area of the portion 707 (the area of the portion 708>the area of the portion 707). Accordingly, when the object 701 and the object 703 are recognized, the holding of the object 701 is considerably easier than the holding of the object 703.

In the determination step 114, for example, in the case of FIGS. 7A to 7F, the model of the recognized objects (the object 701 and the object 703) is arranged in the recognized positions and orientations of the objects and a columnar three-dimensional region generated when the arranged model is subjected to translation in the direction 709 is acquired. Then, regions overlapped with the regions of other objects (the object 702 and the object 704, respectively) in the three-dimensional region are acquired (the portion 707 and the portion 708, respectively). The holding of the object is determined to be unavailable if the area of the overlap region in the three-dimensional region calculated for the recognized object is larger than or equal to a positive threshold value, and the holding of the object is determined to be available if the area of the overlap region in the three-dimensional region calculated for the recognized object is smaller than the positive threshold value. The determination step 114 may not be based on the comparison between the area and the threshold value. The holding of the object may be determined to be unavailable if the ratio of the overlap region to the area of the recognized object is higher than or equal to a threshold value and the holding of the object may be determined to be available if the ratio of the overlap region to the area of the recognized object is smaller than the threshold value.

The determination may be performed using other methods in the determination step 114 as long as the same object is achieved. For example, the number of three-dimensional points colliding with the recognized object when the three-dimensional points on the object (acquired from the measurement information 102) are projected in a direction opposite to the preferential direction may be processed as the area of the overlap region.

The CPU 201 deletes the position and orientation of the object the holding of which is determined to be unavailable, among the positions and orientations of the objects registered in the list 113, to create a new list 115. In other words, the CPU 201 determines the object to be excluded from the objects to be held and deletes the determined object from the list 113.

The CPU 201 generates a control signal for controlling the position and orientation of the arm of the robot using the positions and orientations of the objects registered in the list 115, in order to cause the robot to hold the object, and supplies the control signal to the robot via the I/O device 209. As described above, since the positions and orientations of the objects are sequentially registered in the list 115 from the object closer to the preferential direction 104 side to the object closer to the side opposite to the preferential direction 104, the robot sequentially holds the objects closer to the preferential direction 104 side.

Figure 8:
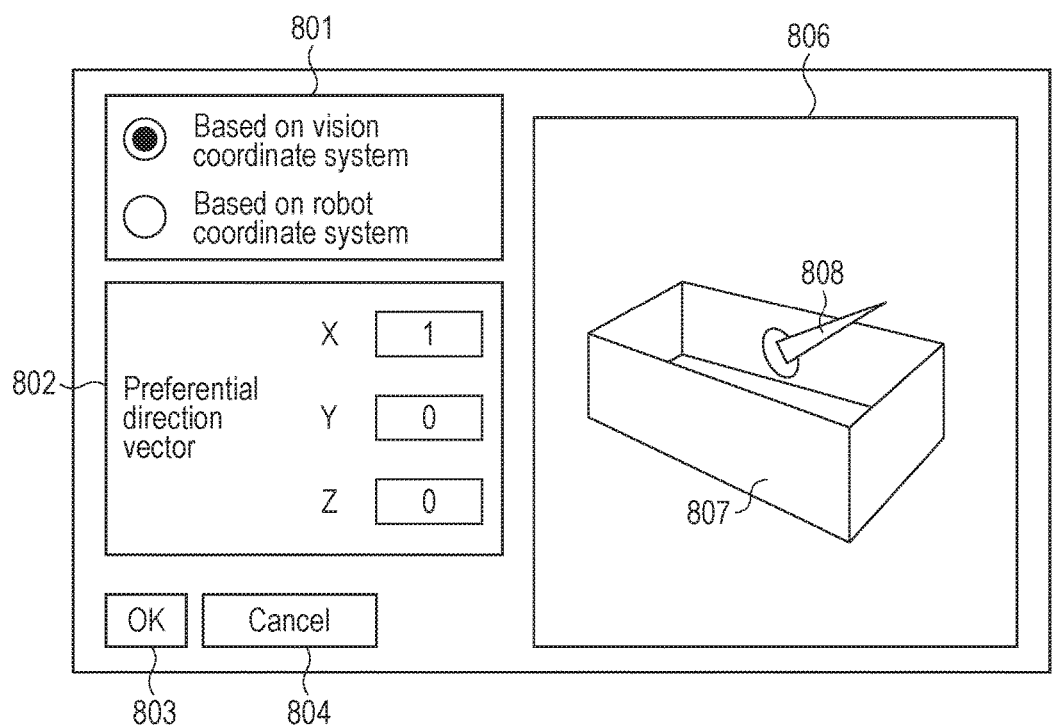
FIG. 8 is a diagram for describing a setting step.

The setting step 103 described above will now be described with reference to FIG. 8. FIG. 8 illustrates an exemplary graphical user interface (GUI) used by the user to set the preferential direction 104. The GUI in FIG. 8 is displayed in the display 206. Control of display of the GUI and processes in response to user's operations on the GUI are performed by the CPU 201.

Radio buttons are provided in a region 801. The radio buttons are used to select a vision coordinate system or a robot coordinate system for a direction vector component defining the preferential direction 104. The vision coordinate system is based on the I/O device 209 (the imaging apparatus 301 in FIG. 3 and the imaging apparatus 402 in FIG. 4) and the Z axis plus direction is normally the Z direction 305 in FIG. 3 and the Z direction 403 in FIG. 4. The robot coordinate system is based on the robot (the robot 302 in FIG. 3 and the robot 404 in FIG. 4). The vision coordinate system is selected in response to checking of an upper radio button by the user with the keyboard 207 or the mouse 208 and the robot coordinate system is selected in response to checking of a lower radio button by the user with the keyboard 207 or the mouse 208. The upper radio button is checked in the example in FIG. 8.

Boxes are provided in a region 802. The boxes are used to input the x component, the y component, and the z component of the direction vector defining the preferential direction 104. In the example in FIG. 8, "1" is input as the x component, "0" is input as the y component, and "0" is input as the z component. Since the respective components set in the above manner are in the coordinate system that is set is response to selection of either of the radio buttons in the region 801, appropriate conversion of the coordinate system is required to use, for example, a world coordinate system. The world coordinate system is a coordinate system in which one point in a physical space is used as the origin and three axes that are at right angles to one another at the origin are the x axis, the y axis, and the z axis.

Upon instruction of an OK button 803 by the user with the keyboard 207 or the mouse 208, the direction vector having the components input into the respective boxes in the region 802, that is, an object 808 representing the preferential direction 104 is displayed in a region 806. An object 807 representing the pallet is also displayed in the region 806. An image in a virtual space, in which the object 807 of the pallet and the object 808 of the preferential direction 104 are arranged, is displayed in the region 806 depending on the position and orientation of a point of view that is currently set. The object 808 has a shape including a disk indicating the direction of the vector and a needle object attached to the disk (the vector extending from the root of the needle to the tip thereof). The orientation of the object 808 is in a direction resulting from conversion of the components specified in the region 802 in the coordinate system specified in the region 801 into the components in the same coordinate system as that of the object 807.

The user is capable of freely changing the position and orientation of the point of view, for example, through a drag operation in the region 806 with the keyboard 207 or the mouse 208. The display in the region 806 is varied with the change of the position and orientation of the point of view. The shape of the object representing the preferential direction 104 is not limited to the above shape. The method of representing the preferential direction 104 is not limited to the representation method using the object. Although the positional relationship in the three-dimensional coordinate is represented by displaying the object 807 of the pallet and the object 808 of the preferential direction 104 in FIG. 8, three-dimensional points that are measured and a three-dimensional graphic representing a vector may be displayed.

Upon instruction of a Cancel button 804 by the user with the keyboard 207 or the mouse 208, the CPU 201 discards the content set in the GUI. When no preferential direction is set, the default preferential direction 104 that is set in advance and that is stored in the secondary storage unit 204 may be used.

The CPU 201 clears the GUI in FIG. 8 from the display 206 in response to instruction of the OK button 803 or the Cancel button. 804 by the user with the keyboard 207 or the mouse 208.

[Second Embodiment]

The difference from the first embodiment will now be focused in the following description and a second embodiment is the same as the first embodiment unless specifically described. The second embodiment differs from the first embodiment in the method of setting the preferential direction 104. The method of setting the preferential direction 104 in the second embodiment will now be described with reference to FIGS. 9A to 9C. An object 901 representing the pallet and an object 902 representing the preferential direction 104 are used for description in FIGS. 9A to 9C, as in FIG. 8.

Figure 9A:
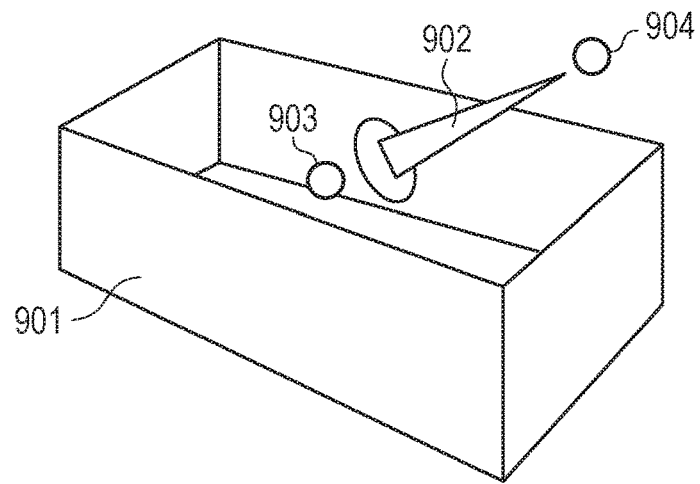
FIGS. 9A to 9C are diagrams for describing how to set a preferential direction according to a second embodiment.

FIG. 9A illustrates an example in which a start point 903 and an end point 904 of the preferential direction are instructed with the robot. Normally, the distal end (flange) of the robot arm is moved to the start point for instruction and, then, is moved to the end point for instruction or the distal end (flange) of the robot arm is moved to the end point for instruction and, then, is moved to the start point for instruction. It is useful to use this protocol for instruction when the holding operation by the robot is specified through teaching. Each time the robot arm is moved to instruct the start point or the end point of the preferential direction 104, the CPU 201 acquires the instructed position from the robot and sets a vector from the instructed position of the start point to the instructed position of the end point as the direction vector of the preferential direction 104.

Figure 9B:
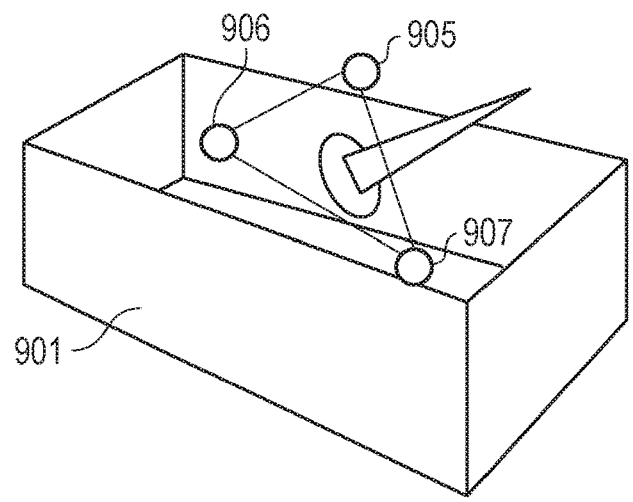
Figure 9C:
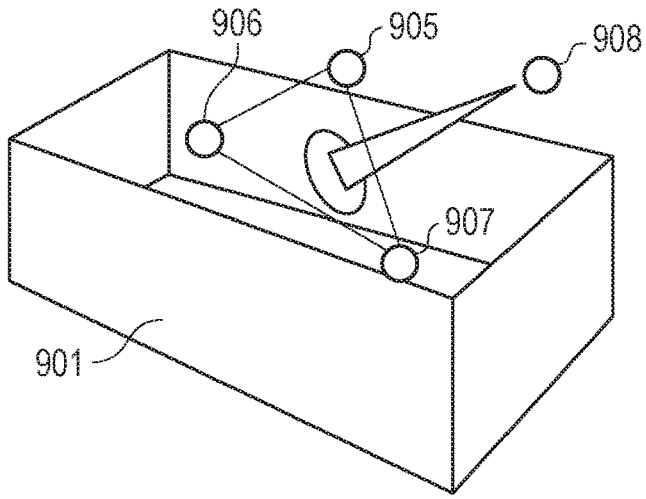

In contrast, when the plane of the surface layer of the objects is specified to set the preferential direction in holding, as illustrated in FIG. 3, it is useful to use methods illustrated in FIG. 9B and FIG. 9C. In the example in FIG. 9B, three points (points 905 to 907) in the three-dimensional space are instructed with the robot arm. Upon acquisition of the three-dimensional positions of these three points, the CPU 201 acquires the normal of the plane composed of the three points as the vector representing the preferential direction. The orientation of the vector is determined by the instruction order of the three points and it is determined in advance whether the right handed coordinate system or the left handed coordinate system is used. Another exemplary method of specifying the orientation of the vector is a method of specifying three points (points 905 to 907) defining a plane and one point 908 apart from the plane, as the one illustrated in FIG. 9C. In this case, the direction from the plane composed of the three points to the point 908 is the direction of the normal.

The above method of instructing the position using the robot arm and specifying the preferential direction on the basis of the instructed position is performed in the setting step 103 described above. Other various methods may be used to determine the preferential direction 104 with the robot arm.

[Third Embodiment]

The difference from the first embodiment will now be focused in the following description and a third embodiment is the same as the first embodiment unless specifically described. The third embodiment differs from the first embodiment in the method of setting the preferential direction 104. The method of setting the preferential direction 104 in the third embodiment will now be described with reference to FIGS. 10A and 10B.

Figure 10A:
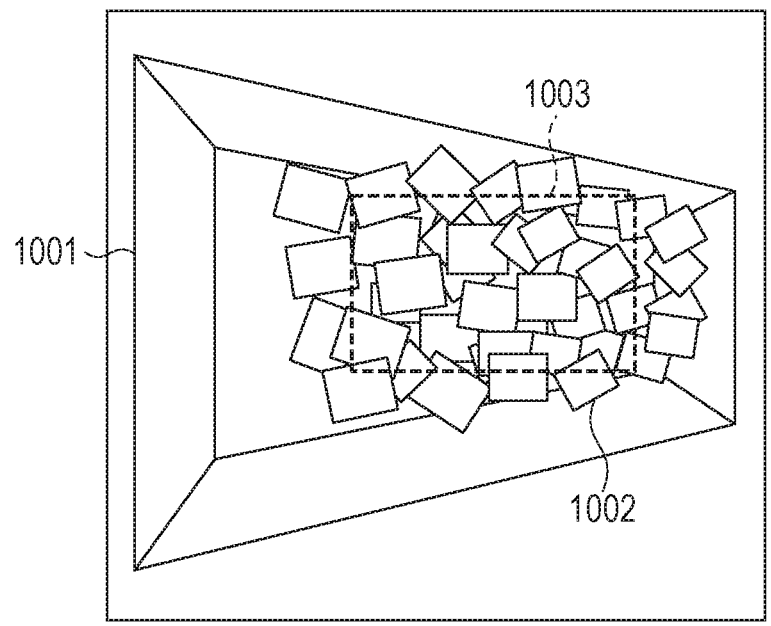
FIGS. 10A and 10B are diagrams for describing how to set the preferential direction according to a third embodiment.
Figure 10B:
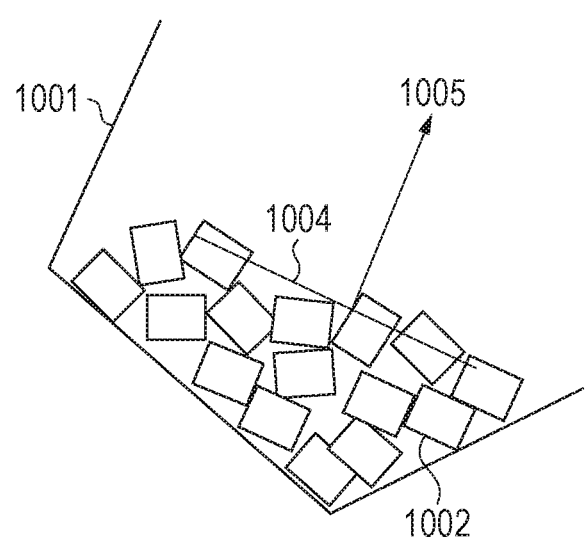

It is assumed that an image illustrated in FIG. 10A is captured with the I/O device 209. The image in FIG. 10A includes objects 1002 loaded in a pallet 1001. A cross-section of the pallet when the image illustrated in FIG. 10A is captured is illustrated in FIG. 10B. As described above in the description of the setup status in FIG. 3, although the surface of the objects that are loaded is inclined from the horizontal plane, the angle of the inclination of the loaded objects is smaller than the angle of the inclination of the bottom face of the pallet. In this situation, the direction of the normal of a schematic plane formed of the surface of the objects is appropriate for the preferential direction in holding. A method of easily setting the plane and the direction of the normal is provided in the third embodiment.

First, the image in FIG. 10A is displayed in the display 206 and the user specifies a partial region with the keyboard 207 or the mouse 208. In the example in FIG. 10A, a rectangle region denoted by reference numeral 1003 is specified. Then, a schematic plane 1004 composed of the three-dimensional points corresponding to the respective pixels in the rectangle region 1003 is acquired through plane fitting using, for example, least squares by using the three-dimensional coordinate of the three-dimensional points corresponding to the respective pixels in the rectangle region 1003. A normal 1005 of the schematic plane 1004 is set as the preferential direction in holding. Although the partial region specified by the user is a rectangle region in FIGS. 10A and 10B, the partial region specified by the user is not limited to the rectangle region. A portion surrounded by an ellipse or a free curve may be used as the partial region. Part or all of the first to third embodiments and their modifications may be appropriately combined for use or the first to third embodiments and their modifications may be selectively used.

Although the examples in which any of the objects loaded in bulk is held are described in the above embodiments, the application of the present invention is not limited to the above ones. For example, an embodiment of the present invention is applicable to a case in which an object arranged on a threshold in the pallet is to be held or a case in which an object that is being hung, like a hanger, is to be held.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-233759, filed Nov. 30, 2015, which is hereby incorporated by reference herein in its entirety.

What is claimed is:

1. An information processing apparatus for controlling a robot which holds and moves an object, the apparatus comprising:
a processor,
wherein the processor acquires, from a measurement apparatus, a three-dimensional coordinate of a plurality of objects measured in distance by the measurement apparatus,
acquires a position in an oblique direction inclining with respect to a measuring direction of a distance from the measurement apparatus to the object for the three-dimensional coordinate of the plurality of objects, and
determines an order to hold the plurality of objects by the robot based on the position in the oblique direction and outputs an information representing the order, and
wherein one of the axes of the three-dimensional coordinate is a measuring direction of the distance from the measurement apparatus to an object.

2. The information processing apparatus according to claim 1,
wherein the processor determines the order in an order of position higher in the oblique direction.

3. The information processing apparatus according to claim 1, wherein the processor
acquires an image of the plurality of objects measured in distance by the measurement apparatus,
acquires the three-dimensional coordinate of each point of the plurality of objects from the image,
sets a region including a three-dimensional coordinate positioning at an end portion in the oblique direction among each point of the three-dimensional coordinate in the image as a recognition region, and
acquires a position and posture of the plurality of objects in the recognition region.

4. The information processing apparatus according to claim 1, wherein the processor determines whether holding of the plurality of objects determined in the order with a holding unit is available or not based on the oblique direction and an orientation of the holding unit in a state in which the holding unit holds the object.

5. The information processing apparatus according to claim 4,
wherein the processor performs the determination based on inner product of the oblique direction and the orientation of the holding unit.

6. The information processing apparatus according to claim 4,
wherein the processor calculates a degree of overlap between objects when viewed from the oblique direction and determines whether holding of the plurality of objects determined in the order with a holding unit is available or not based on the degree of overlap.

7. The information processing apparatus according to claim 1,
wherein the processor sets the oblique direction.

8. The information processing apparatus according to claim 7,
wherein the processor sets the oblique direction in accordance with a user's operation.

9. The information processing apparatus according to claim 7,
wherein the processor sets the oblique direction based on a position instructed by a holding unit that holds an object.

10. The information processing apparatus according to claim 7,
wherein the processor
acquires a three-dimensional coordinate of each point of the plurality of objects measured in distance by the measurement apparatus,
determines a plane based on the three-dimensional coordinated of each point, and sets the oblique direction based on the plane being determined.

11. The information processing apparatus according to claim 1, wherein the processor
acquires a three-dimensional coordinate of each point of a plurality of objects measured in distance by the measurement apparatus,
acquires a position in an oblique direction with respect to each point of the three-dimensional coordinate, and
determines the order based on the position of each point in an oblique direction.

12. An information processing method performed by an information processing apparatus and performed for controlling a robot which holds and moves an object, the method comprising:
acquiring, from a measurement apparatus, a three-dimensional coordinate of a plurality of objects measured in distance by the measurement apparatus,
acquiring a position in an oblique direction inclining with respect to a measuring direction of a distance from the measurement apparatus to the object for the three-dimensional coordinate of the plurality of objects,
acquiring a three-dimensional coordinate of a plurality of position in an oblique direction inclining with respect to a measuring direction of a distance between the measurement apparatus and the object for each three-dimensional coordinate of the plurality of objects,
determining an order to hold the plurality of objects by the robot and outputs an information representing the order based on the position in the oblique direction,
wherein one of the axes of the three-dimensional coordinate is a measuring direction of the distance from the measurement apparatus to an object.

13. A non-transitory computer-readable storage medium storing a computer program that causes a computer to perform an information processing method for controlling a robot which holds and moves an object, the method comprising:
acquiring, from a measurement apparatus, a three-dimensional coordinate of a plurality of objects measured in distance by the measurement apparatus,
acquiring a position in an oblique direction inclining with respect to a measuring direction of a distance from the measurement apparatus to the object for the three-dimensional coordinate of the plurality of objects,
determining an order to hold the plurality of objects by the robot and outputs an information representing the order based on the position in the oblique direction,
wherein one of the axes of the three-dimensional coordinate is a measuring direction of the distance from the measurement apparatus to an object.

14. A measurement apparatus, comprising:
a measurement unit configured to measure a distance between the measurement apparatus and an object, and
a processor,
wherein the processor acquires, from the measurement unit, a three-dimensional coordinate of a plurality of objects measured in distance by the measurement apparatus, acquires a position in an oblique direction inclining with respect to a measuring direction of a distance from the measurement unit to the object for the three-dimensional coordinate of the plurality of objects, and determines an order to hold the plurality of objects by a robot and outputs an information representing the order based on the position in the oblique direction, and wherein one of the axes of the three-dimensional coordinate is a measuring direction of the distance from the measurement apparatus to an object.

15. A method, comprising steps of:

measuring a distance from a measurement apparatus to a plurality of objects by using the measurement apparatus;

acquiring a three-dimensional coordinate of a plurality of objects measured in distance by the measurement apparatus;

acquiring a position in an oblique direction inclining with respect to a measuring direction of a distance from the measurement apparatus to the object for the three-dimensional coordinate of the plurality of objects;

creating a list arranged with a plurality of objects in an order of measuring a distance by the measurement apparatus based on the position in the oblique direction; and holding each of the plurality of objects by a robot based on the list, wherein one of the axes of the three-dimensional coordinate is a measuring direction of the distance from the measurement apparatus to an object.

* * * * *